(12) United States Patent
Lin et al.

(10) Patent No.: US 7,702,005 B2
(45) Date of Patent: Apr. 20, 2010

(54) METHOD FOR TRANSMITTING AND/OR RECEIVING AUDIO DATA OF A PLURALITY OF AUDIO SOURCES THROUGH A SINGLE SPDIF LINK, AND RELATED APPARATUS

(75) Inventors: Chun-Fu Lin, Kaohsiung Country (TW); Ken-Ming Li, Santa Clara, CA (US); Xiao-Yun Gu, Beijing (CN); Chi-Chien Chen, Taipei (TW); Feng-Sheng Chang, Keelung (TW); Tao Liu, Beijing (CN); Ke-Fu Ji, Anhui province (CN)

(73) Assignee: Alpha Imaging Technology Corp., Jubei, Hsin Chu (TW)

( * ) Notice: Subject to any disclaimer, the term of this patent is extended or adjusted under 35 U.S.C. 154(b) by 877 days.

(21) Appl. No.: 11/465,447

(22) Filed: Aug. 17, 2006

(65) Prior Publication Data

US 2008/0043823 A1 Feb. 21, 2008

(51) Int. Cl.
*H04L 5/16* (2006.01)
(52) U.S. Cl. ......................... 375/220; 375/222; 375/356
(58) Field of Classification Search ................. 375/220, 375/222, 356
See application file for complete search history.

(56) References Cited

U.S. PATENT DOCUMENTS

| 5,889,820 | A | * | 3/1999 | Adams | 375/282 |
| 6,768,433 | B1 | * | 7/2004 | Toth et al. | 341/105 |
| 6,782,300 | B2 | * | 8/2004 | Pillay et al. | 700/94 |
| 2004/0267951 | A1 | * | 12/2004 | Hattori | 709/231 |
| 2005/0283350 | A1 | * | 12/2005 | Luu et al. | 703/19 |

* cited by examiner

*Primary Examiner*—Shuwang Liu
*Assistant Examiner*—Kabir A Timory
(74) *Attorney, Agent, or Firm*—Winston Hsu

(57) ABSTRACT

A method for transmitting audio data of a plurality of audio sources through a single SPDIF link, includes: sequencing and multiplexing the audio data of the plurality of audio sources to pack the audio data of the plurality of audio sources into a plurality of frames of a block; performing bi-phase mark encoding on the audio data in the frames; appending preambles Z, X, and Y of the AES3/SPDIF stream format to the frames according to the number of audio sources in a first mode, or appending preambles Z, X, and Y of the AES3/SPDIF stream format and a specific preamble differing from preambles Z, X, and Y to the frames according to the number of audio sources in a second mode; and outputting the frames carrying the audio data into the SPDIF link with a frame rate greater than an audio sampling frequency of one of the audio sources.

28 Claims, 11 Drawing Sheets

| No of channels | Sub-frame N | Sub-frame N-1 | Sub-frame N-2 | Sub-frame N+3 | Sub-frame N-4 | Sub-frame N+5 | Sub-frame N+6 | Sub-frame N+7 | Sub-frame N+8 | Sub-frame N+9 | No of sub-frames between T |
|---|---|---|---|---|---|---|---|---|---|---|---|
| | X or Z | Y | X | Y | X | Y | X | Y | X | Y | |
| 2 | A | B | A | B | A | B | A | B | A | B | N/A |
| | T or Z | Y | X | Y | T | Y | X | Y | T | Y | |
| 4 | A | B | C | D | A | B | C | D | A | B | 4 |
| | T or Z | Y | X | Y | X | Y | T | Y | X | Y | |
| 6 | A | B | C | D | E | F | A | B | C | D | 6 |
| | T or Z | Y | X | Y | X | Y | X | Y | T | Y | |
| 8 | A | B | C | D | E | F | G | H | A | B | 8 |

| No of channels | Sub-frame N | Sub-frame N+1 | Sub-frame N+2 | Sub-frame N+3 | Sub-frame N+4 | Sub-frame N+5 | Sub-frame N+6 | Sub-frame N+7 | Sub-frame N+8 | Sub-frame N+9 | No of sub-frames between X |
|---|---|---|---|---|---|---|---|---|---|---|---|
| 2 | X or Z / A | Y / B | X / A | Y / B | X / A | Y / B | X / A | Y / B | X / A | Y / B | 2 |
| 4 | X or Z / A | Y / B | Y / C | Y / D | X / A | Y / B | Y / C | Y / D | X / A | Y / B | 4 |
| 6 | X or Z / A | Y / B | Y / C | Y / D | Y / E | Y / F | X / A | Y / B | Y / C | Y / D | 6 |
| 8 | X or Z / A | Y / B | Y / C | Y / D | Y / E | Y / F | Y / G | Y / H | X / A | Y / B | 8 |

Fig. 5

| No. of audio channels | IEC 60958 Frame rate | No. of stereo audio output ports | Output audio sampling frequency |
|---|---|---|---|
| 2 | 48KHz | 1 | 48KHz |
| 4 | 96KHz | 2 | 48KHz |
| 6 | 144KHz | 3 | 48KHz |
| 8 | 192KHz | 4 | 48KHz |

Fig. 6

| No of channels | Sub-frame N (X or Z) | Sub-frame N+1 (Y) | Sub-frame N+2 (X) | Sub-frame N+3 (Y) | Sub-frame N+4 (X) | Sub-frame N+5 (Y) | Sub-frame N+6 (X) | Sub-frame N+7 (Y) | Sub-frame N+8 (X) | Sub-frame N+9 (Y) | No of sub-frames between T |
| --- | --- | --- | --- | --- | --- | --- | --- | --- | --- | --- | --- |
| 2 | A | B | A | B | A | B | A | B | A | B | N/A |
| 4 | A (T or Z) | B | C | D | A (T) | B | C | D | A (T) | B | 4 |
| 6 | A (T or Z) | B | C | D | E | F | A (T) | B | C | D | 6 |
| 8 | A (T or Z) | B | C | D | E | F | G | H | A (T) | B | 8 |

Fig. 7

METHOD FOR TRANSMITTING AND/OR RECEIVING AUDIO DATA OF A PLURALITY OF AUDIO SOURCES THROUGH A SINGLE SPDIF LINK, AND RELATED APPARATUS

BACKGROUND OF THE INVENTION

1. Field of the Invention

The present invention relates to Sony/Philips Digital Interface (SPDIF) applications, and more particularly, to methods for transmitting and/or receiving audio data of a plurality of audio sources through a single SPDIF link, and related apparatuses.

2. Description of the Prior Art

Please refer to FIG. 1. FIG. 1 is a diagram of a combination of one SPDIF transmitter (Tx) and one SPDIF receiver (Rx) according to the prior art, where one SPDIF link coupled between the SPDIF transmitter and the SPDIF receiver is utilized for transmitting audio data of one audio source. The SPDIF transmitter typically comprises some functional units such as audio channel input, bi-phase mark encoding, and preamble appending, which are integrated together in this example. The SPDIF receiver typically comprises some functional units such as bi-phase mark decoding, preamble detection, and audio channel output, which are also integrated together in this example. Please refer to related standards such as Audio Engineering Society-3 (AES3), IEC-60958, and IEC-61937 for more information.

FIG. 2 illustrates a diagram of a combination of four SPDIF transmitters and four SPDIF receivers according to the prior art, where four SPDIF links coupled between the SPDIF transmitters and the SPDIF receivers are utilized for transmitting audio data of four audio sources, respectively. According to the prior art, there are substantially four copies of the architecture shown in FIG. 1 required for transmitting the audio data of the four audio sources. If the number of audio sources increases, related costs increase accordingly. Worst of all, when utilizing pipes for installing cables and the like, for example, a pipe connecting several locations in a building is required, and if there is not enough room for installing required number of SPDIF links, the implementation of a multiple audio source SPDIF system becomes quite complex.

SUMMARY OF THE INVENTION

It is an objective of the claimed invention to provide methods for transmitting and/or receiving audio data of a plurality of audio sources through a single SPDIF link, and related apparatuses.

According to one embodiment of the claimed invention, a method for transmitting audio data of a plurality of audio sources through a single SPDIF link is disclosed. The method comprises: sequencing and multiplexing the audio data of the plurality of audio sources to pack the audio data of the plurality of audio sources into a plurality of frames of a block, where each frame comprises two sub-frames; performing bi-phase mark encoding on the audio data in the frames; appending preambles Z, X, and Y of the AES3/SPDIF stream format to the frames according to the number of audio sources in a first mode, or appending preambles Z, X, and Y of the AES3/SPDIF stream format and a specific preamble differing from preambles Z, X, and Y to the frames according to the number of audio sources in a second mode; and outputting the frames carrying the audio data into the single SPDIF link with a frame rate greater than an audio sampling frequency of one of the audio sources. In addition, the step of appending preambles Z, X, and Y of the AES3/SPDIF stream format to the frames further comprises: appending preamble Y to the first sub-frame of at least one frame of the frames according to the number of audio sources or appending preamble X to the second sub-frame of at least one frame of the frames according to the number of audio sources; and appending one of preambles Z, X, and Y to one of the other sub-frames according to the AES3/SPDIF stream format. Additionally, the step of appending preambles Z, X, and Y of the AES3/SPDIF stream format and the specific preamble differing from preambles Z, X, and Y to the frames further comprises: appending the specific preamble to at least one sub-frame of at least one frame of the frames according to the number of audio sources; and appending one of preambles Z, X, and Y to one of the other sub-frames according to the AES3/SPDIF stream format.

According to another embodiment of the claimed invention, a method for receiving audio data of a plurality of audio sources through a single SPDIF link is disclosed. The method comprises: receiving a plurality of frames of a block from the single SPDIF link, where each frame comprises two sub-frames, the frames carry the audio data that are bi-phase mark encoded, and before the frames are transmitted through the single SPDIF link with a frame rate greater than an audio sampling frequency of one of the audio sources, preambles Z, X, and Y of the AES3/SPDIF stream format are appended to the frames according to the number of audio sources in a first mode, or preambles Z, X, and Y of the AES3/SPDIF stream format and a specific preamble differing from preambles Z, X, and Y are appended to the frames according to the number of audio sources in a second mode. The method further comprises: performing bi-phase mark decoding on the audio data in the frames; and detecting the preambles appended to the frames to unpack the audio data from frames, demultiplex the audio data of the plurality of audio sources, and output the audio data of at least one audio source of the plurality of audio sources with the audio sampling frequency of the at least one audio source. In addition, if preambles Z, X, and Y of the AES3/SPDIF stream format are appended to the frames in the first mode, preamble Y is appended to the first sub-frame of at least one frame of the frames according to the number of audio sources or preamble X is appended to the second sub-frame of at least one frame of the frames according to the number of audio sources, and preambles Z, X, and Y are further appended to the other sub-frames according to the AES3/SPDIF stream format. Additionally, if preambles Z, X, and Y of the AES3/SPDIF stream format and the specific preamble differing from preambles Z, X, and Y are appended to the frames in the second mode, the specific preamble is appended to at least one sub-frame of at least one frame of the frames according to the number of audio sources, and preambles Z, X, and Y are further appended to the other sub-frames according to the AES3/SPDIF stream format.

According to another embodiment of the claimed invention, an apparatus for transmitting audio data of a plurality of audio sources through a single SPDIF link is disclosed. The apparatus comprises: a multiplexer for sequencing and multiplexing the audio data of the plurality of audio sources; a frame packing unit, coupled to the multiplexer, for packing the audio data of the plurality of audio sources into a plurality of frames of a block, wherein each frame comprises two sub-frames; a bi-phase mark encoder, coupled to the frame packing unit, for performing bi-phase mark encoding on the audio data in the frames; a preamble appending unit, coupled to the bi-phase mark encoder, for appending preambles Z, X, and Y of the AES3/SPDIF stream format to the frames according to the number of audio sources in a first mode, or appending preambles Z, X, and Y of the AES3/SPDIF stream format and a specific preamble differing from preambles Z, X, and Y to the frames according to the number of audio sources in a second mode; and an output driver, coupled to the preamble appending unit, for outputting the frames carrying the audio data into the single SPDIF link with a frame rate greater than the audio sampling frequency of one of the audio sources. In addition, if preambles Z, X, and Y of the AES3/SPDIF stream format are appended to the frames in the first mode, the preamble appending unit appends preamble Y to the first sub-frame of at least one frame of the frames according to the number of audio sources or the preamble appending unit appends preamble X to the second sub-frame of at least one frame of the frames according to the number of audio sources, and the preamble appending unit further appends one of preambles Z, X, and Y to one of the other sub-frames according to the AES3/SPDIF stream format. Additionally, if preambles Z, X, and Y of the AES3/SPDIF stream format and the specific preamble differing from preambles Z, X, and Y are appended to the frames in the second mode, the preamble appending unit appends the specific preamble to at least one sub-frame of at least one frame of the frames according to the number of audio sources, and the preamble appending unit further appends one of preambles Z, X, and Y to one of the other sub-frames according to the AES3/SPDIF stream format.

According to another embodiment of the claimed invention, an apparatus for receiving audio data of a plurality of audio sources through a single SPDIF link is disclosed. The apparatus comprises: an input terminal, coupled to the single SPDIF link, for receiving a plurality of frames of a block from the single SPDIF link, where each frame comprises two sub-frames, the frames carry the audio data that are bi-phase mark encoded, and before the frames are transmitted through the single SPDIF link with a frame rate greater than the audio sampling frequency of one of the audio sources, preambles Z, X, and Y of the AES3/SPDIF stream format are appended to the frames according to the number of audio sources in a first mode, or preambles Z, X, and Y of the AES3/SPDIF stream format and a specific preamble differing from preambles Z, X, and Y are appended to the frames according to the number of audio sources in a second mode. The apparatus comprises: a bi-phase mark decoder, coupled to the input terminal, for performing bi-phase mark decoding on the audio data in the frames; a detection unit, coupled to the bi-phase mark decoder, for detecting the preambles appended to the frames; a frame unpacking unit, coupled to the detection unit, for unpacking the audio data from frames; a demultiplexer, coupled to the frame unpacking unit, for demultiplexing the audio data of the plurality of audio sources; and an output stage, coupled to the demultiplexer, for outputting the audio data of at least one audio source of the plurality of audio sources with the audio sampling frequency of the at least one audio source. In addition, if preambles Z, X, and Y of the AES3/SPDIF stream format are appended to the frames in the first mode, preamble Y is appended to the first sub-frame of at least one frame of the frames according to the number of audio sources or preamble X is appended to the second sub-frame of at least one frame of the frames according to the number of audio sources, and preambles Z, X, and Y are further appended to the other sub-frames according to the AES3/SPDIF stream format. Additionally, if preambles Z, X, and Y of the AES3/SPDIF stream format and the specific preamble differing from preambles Z, X, and Y are appended to the frames in the second mode, the specific preamble is appended to at least one sub-frame of at least one frame of the frames according to the number of audio sources, and preambles Z, X, and Y are further appended to the other sub-frames according to the AES3/SPDIF stream format.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 illustrates how preambles are appended to sub-frames such as those shown in FIG. 4 in one mode in contrast to a normal mode according to one embodiment of the present invention.

FIG. 6 illustrates the corresponding parameters for implementing the embodiment shown in FIG. 5.

FIG. 7 illustrates how preambles are appended to sub-frames such as those shown in FIG. 4 in another mode in contrast to the normal mode according to one embodiment of the present invention.

DETAILED DESCRIPTION

In the descriptions hereafter, the term "SPDIF link" covers a wide range of digital audio stream transmitting media. According to different embodiments of the present invention, a SPDIF link can be implemented by utilizing one of various kinds of transmission materials, for example, copper cable, optical fiber . . . etc., where the serial data therein can be transmitted in the AES3/SPDIF format.

In addition, each of the audio sources in some embodiments of the present invention can be implemented as a stereo audio source (which is typically a 2-channel audio source), for simplicity while describing these embodiments. However, this is not a limitation to the present invention. According to different embodiments of the present invention, an audio source thereof may correspond to more than two channels or correspond to only one channel. For example, a 5.1-channel home theater system implemented according to one embodiment of the present invention can be described as a system corresponding to three 2-channel audio sources.

Figure 3:
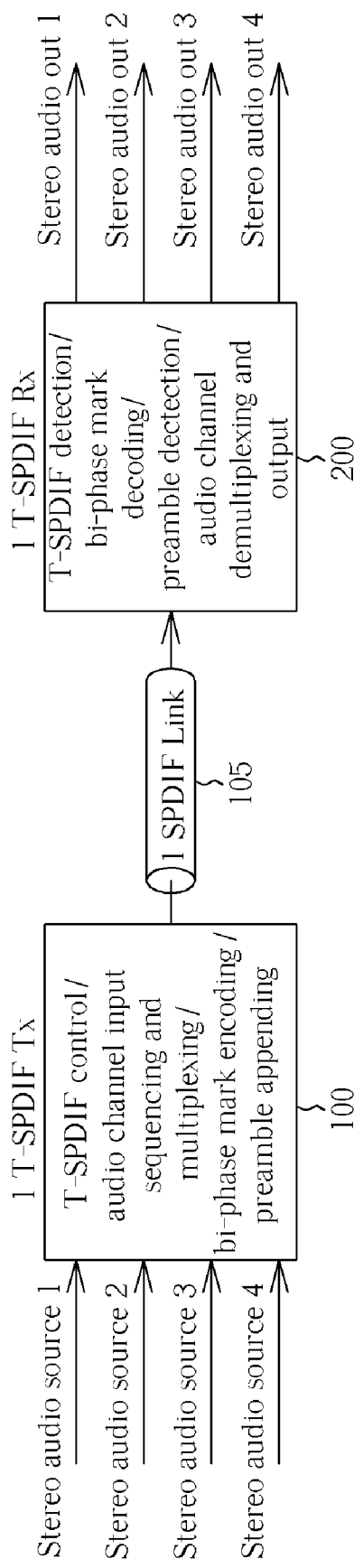
FIG. 3 is a diagram of an apparatus for transmitting and receiving audio data of a plurality of audio sources through a single SPDIF link according to one embodiment of the present invention.

Please refer to FIG. 3 illustrating a diagram of an apparatus for transmitting and receiving audio data of a plurality of audio sources through a single SPDIF link 105 according to one embodiment of the present invention. The apparatus shown in FIG. 3 comprises a T-SPDIF transmitter (Tx) 100 and a T-SPDIF receiver (Rx) 200. Herein, the new term T-SP-DIF is introduced to distinguish a plurality of features disclosed in this invention from the prior art.

Figure 1:
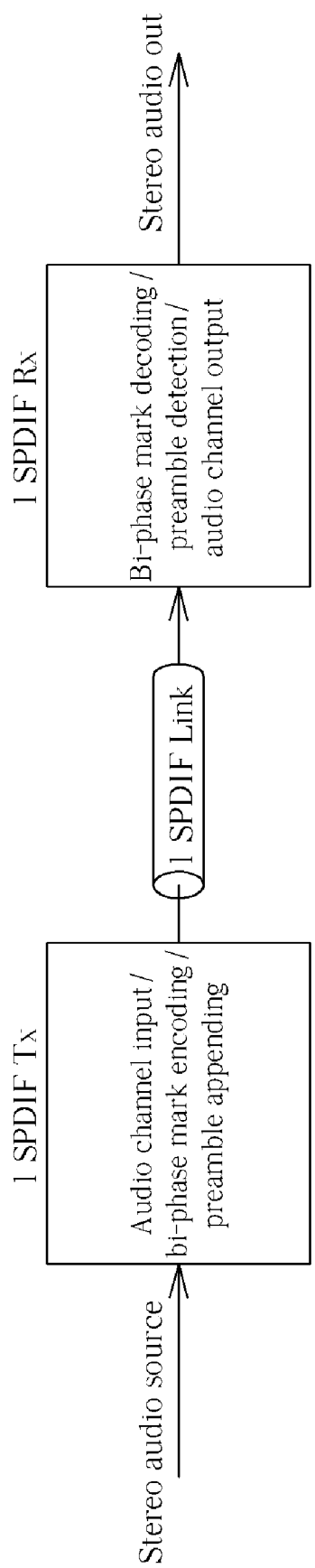
FIG. 1 is a diagram of a combination of one SPDIF transmitter (Tx) and one SPDIF receiver (Rx) according to the prior art, where one SPDIF link coupled between the SPDIF transmitter and the SPDIF receiver is utilized for transmitting audio data of one audio source.
Figure 2:
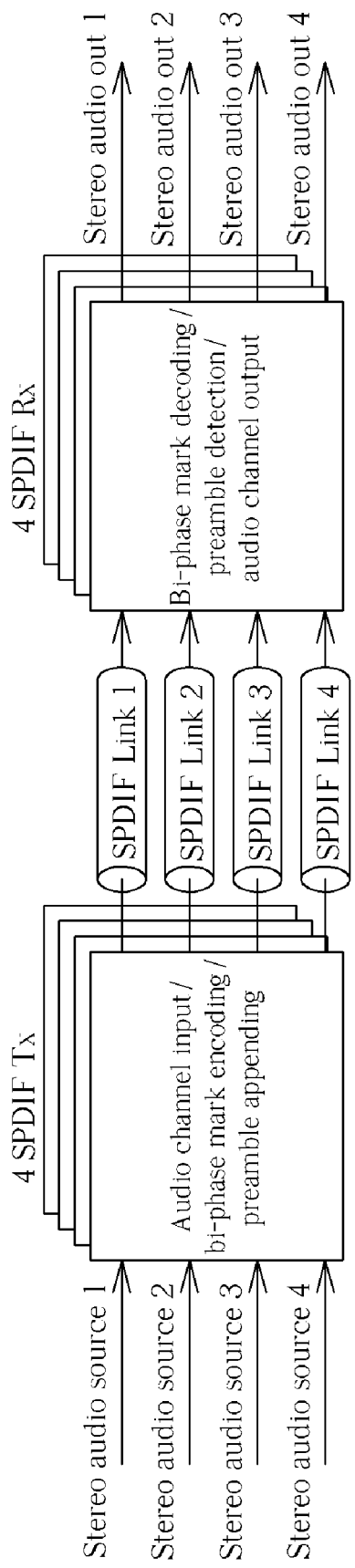
FIG. 2 is a diagram of a combination of four SPDIF transmitters and four SPDIF receivers according to the prior art, where four SPDIF links coupled between the SPDIF transmitters and the SPDIF receivers are utilized for transmitting audio data of four audio sources.

According to this embodiment, the audio sources are serial digital audio sources. On the one hand, the T-SPDIF transmitter 100 and the T-SPDIF receiver 200 are capable of performing the same operations for transmitting audio data of a single audio source through the single SPDIF link 105 in a normal mode as those of the architecture shown in FIG. 1, where the single SPDIF link 105 can be implemented with an optical fiber or a coaxial cable. On the other hand, in a T-SP-DIF mode disclosed in this invention, for example, a Type-1 T-SPDIF mode or a Type-2 T-SPDIF mode, the T-SPDIF transmitter 100 is capable of transmitting the audio data of the plurality of audio sources (which include four audio sources according to the embodiment shown in FIG. 3) through the single SPDIF link 105, and the T-SPDIF receiver 200 is capable of receiving the audio data of the plurality of audio sources through the single SPDIF link 105. As a result, an audio on demand system utilizing the single SPDIF link 105, rather than a plurality of SPDIF links such as those shown in FIG. 2, can be realized according to this embodiment of the present invention.

Figure 4:
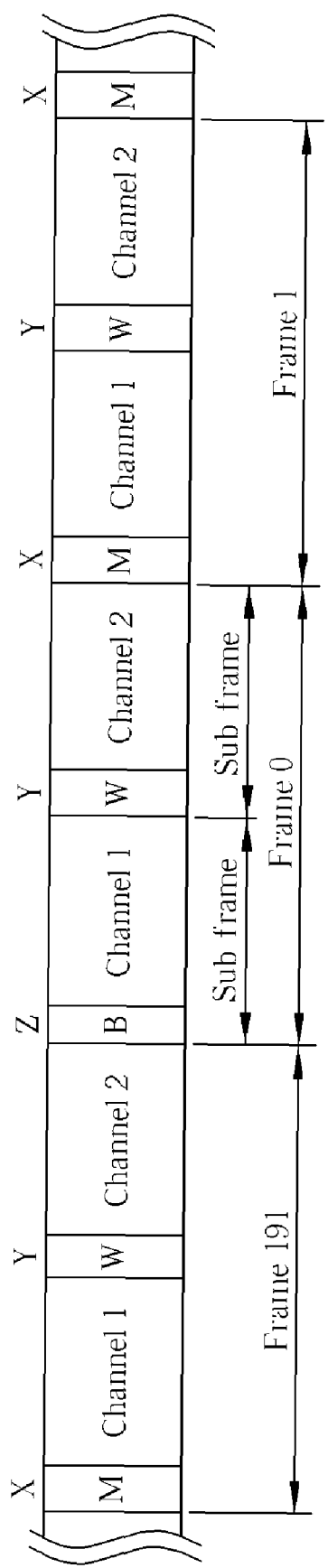
FIG. 4 illustrates a frame structure that can be utilized by the apparatus shown in FIG. 3 according to one embodiment of the present invention.

Please refer to FIG. 4. FIG. 4 illustrates a frame structure that can be utilized by the apparatus shown in FIG. 3 according to one embodiment of the present invention, where the embodiment can be applied to the embodiment shown in FIG. 3. Here, Frame 191 shown in FIG. 4 is the last frame of one block, and Frame 0 and Frame 1 shown in FIG. 4 are the first two frames of the next block. According to this embodiment, each block comprises 192 frames, and each frame comprises two sub-frames. In the beginning of each sub-frame, there is a time slot for appending a preamble to the sub-frame. Hereafter, preambles M, W, and B are respectively referred to as preambles X, Y, and Z according to the AES3/SPDIF stream format. Please note that the notation "B" is commonly utilized for describing a channel such as Channel 2 of the second sub-frame of one of the frames as shown in FIG. 4, and therefore, the notation "B" is no longer referred to as a preamble according to the present invention.

According to this embodiment, if the apparatus shown in FIG. 3 operates in the normal mode, the frame structure shown in FIG. 4 may comply with the AES3/SPDIF stream format. However, if the apparatus shown in FIG. 3 operates in a T-SPDIF mode such as the Type-1 T-SPDIF mode or the Type-2 T-SPDIF mode mentioned above, the frame structure shown in FIG. 4 does not comply with the AES3/SPDIF stream format since the T-SPDIF transmitter 100 may append preambles to the frames according to the number of audio sources involved in the T-SPDIF mode rather than the rules utilized in the normal mode.

Please refer to FIG. 5. FIG. 5 illustrates how preambles are appended to sub-frames such as those shown in FIG. 4 in the Type-1 T-SPDIF mode mentioned above in contrast to the normal mode according to one embodiment of the present invention, where the method shown in FIG. 5 can be applied to the embodiment shown in FIG. 3. The notations (A, B), (C, D), (E, F), and (G, H) respectively represent digital audio channel pairs like Channel 1 and Channel 2 shown in one of the frames shown in FIG. 4, where preambles X, Y, and Z are labeled at the upper left corners of the sub-frames for the convenience of comparison between different sub-frames.

Regarding the first row of frames shown in FIG. 5, if the number of channels to be transmitted is equal to two, which means the number of audio sources whose audio data are determined to be transmitted through the single SPDIF link 105 is equal to one, the T-SPDIF transmitter 100 operates in the normal mode, and appends preambles X, Y, and Z to the frames (more particularly, the sub-frames) according to the AES3/SPDIF stream format.

Regarding the second, the third, or the fourth row of frames shown in FIG. 5, if the number of channels to be transmitted is equal to four, six, or eight, which means the number of audio sources whose audio data are determined to be transmitted through the single SPDIF link 105 is equal to two, three, or four, respectively, the T-SPDIF transmitter 100 may operate in the Type-1 T-SPDIF mode, and append preambles X, Y, and Z to the frames according to the number of audio sources whose audio data are determined to be transmitted through the single SPDIF link 105. In contrast to the prior art, preamble Y can be appended to the first sub-frame of a frame, for example, Sub-frame (N+2) corresponding to Channel C in the second, the third, or the fourth row of frames shown in FIG. 5, Sub-frame (N+4) corresponding to Channel E in the third or the fourth row of frames shown in FIG. 5, and Sub-frame (N+6) corresponding to Channel G in the fourth row of frames shown in FIG. 5, in order to indicate the number of channels involved.

It is noted that regarding one of the first, the second, the third, or the fourth row of frames shown in FIG. 5, the number of sub-frames between two closest X's (or between two closest X and Z, for certain cases corresponding to the beginning or end of each block) is equal to the number of channels, as shown in FIG. 5. As a result, according to the preamble detection related to the number of sub-frames between two closest X's and/or between two closest X and Z, the T-SPDIF receiver 200 may detect the number of channels. That is, the T-SPDIF receiver 200 is capable of detecting the number of audio sources whose audio data are transmitted through the single SPDIF link 105 to the T-SPDIF receiver 200 since the number of channels is twice the number of audio sources whose audio data are transmitted through the single SPDIF link 105.

In the Type-1 T-SPDIF mode mentioned above, the preamble appending operations performed by the T-SPDIF transmitter 100 are described in detail as follows. Except the first sub-frame of the frame corresponding to the beginning of the block, preamble Y is appended to the first sub-frame of each of the frames carrying the audio data of the audio sources except a specific audio source, which is the audio source corresponding to the digital audio channel pairs (A, B) (i.e. Channel A and Channel B) in this embodiment. In addition, preambles Z, X, and Y are further appended to the other sub-frames according to the AES3/SPDIF stream format.

According to this embodiment, preamble Z is appended to the first sub-frame of the frame corresponding to the beginning of the block. In addition, except the first sub-frame of the frame corresponding to the beginning of the block, preamble X is appended to the first sub-frame of each of the frames carrying the audio data of the specific audio source. Additionally, preamble Y is appended to the second sub-frame of each frame.

FIG. 6 illustrates the corresponding parameters for implementing the embodiment shown in FIG. 5. For example, the frame rate for transmitting the frames carrying the audio data varies according to the number of audio channels, where the number of audio channels is twice the number of audio sources involved, and more particularly, the number of audio channels is twice the number of audio sources whose audio data are determined to be transmitted through the single SPDIF link 105. In addition, the output audio sampling rate, which is simply referred to as the audio sampling rate, is unvaried while the number of audio channels varies.

Please refer to FIG. 7. FIG. 7 illustrates how preambles are appended to sub-frames such as those shown in FIG. 4 in the Type-2 T-SPDIF mode mentioned above in contrast to the normal mode according to one embodiment of the present invention. The method shown in FIG. 7 can be applied to the embodiment shown in FIG. 3. The notations (A, B), (C, D), (E, F), and (G, H) respectively represent the digital audio channel pairs mentioned above, where preambles X, Y, and Z and a specific preamble T disclosed in this embodiment are labeled at the upper left corners of the sub-frames for the convenience of comparison between different sub-frames.

Regarding the first row of frames shown in FIG. 7, if the number of channels to be transmitted is equal to two, which means the number of audio sources whose audio data are determined to be transmitted through the single SPDIF link 105 is equal to one, the T-SPDIF transmitter 100 operates in the normal mode, and appends preambles X, Y, and Z to the frames (more particularly, the sub-frames) according to the AES3/SPDIF stream format.

Regarding the second, the third, or the fourth row of frames shown in FIG. 7, if the number of channels to be transmitted is equal to four, six, or eight, which means the number of audio sources whose audio data are determined to be transmitted through the single SPDIF link 105 is equal to two, three, or four, respectively, the T-SPDIF transmitter 100 may operate in the Type-2 T-SPDIF mode, and append preambles X, Y, and Z and the specific preamble T to the frames according to the number of audio sources whose audio data are determined to be transmitted through the single SPDIF link 105. In contrast to the prior art, the specific preamble T can be appended to the first sub-frame of a frame carrying the audio data of a specific audio source, which is the audio source corresponding to the digital audio channel pairs (A, B) (i.e. Channel A and Channel B) in this embodiment. For example, if none of the sub-frames shown in FIG. 7 corresponds to the beginning of a block, the specific preamble T can be appended to Sub-frames N and (N+4) corresponding to Channel A in the second row of frames shown in FIG. 7, Sub-frames N and (N+6) corresponding to Channel A in the third row of frames shown in FIG. 7, and Sub-frames N and (N+8) corresponding to Channel A in the fourth row of frames shown in FIG. 7, in order to indicate the number of channels involved. In addition, if Sub-frame N shown in FIG. 7 corresponds to the beginning of a block, preamble Z, rather than the specific preamble T, is appended to Sub-frame N in the second, the third, or the fourth row of frames shown in FIG. 7.

It is noted that regarding one of the second, the third, or the fourth row of frames shown in FIG. 7, the number of sub-frames between two closest T's (or between two closest T and Z, for certain cases corresponding to the beginning or end of each block) is equal to the number of channels, as shown in FIG. 7. As a result, according to the preamble detection related to the number of sub-frames between two closest T's and/or between two closest T and Z, the T-SPDIF receiver 200 may detect the number of channels. That is, the T-SPDIF receiver 200 is capable of detecting the number of audio sources whose audio data are transmitted through the single SPDIF link 105 to the T-SPDIF receiver 200 since the number of channels is twice the number of audio sources whose audio data are transmitted through the single SPDIF link 105.

According to this embodiment, if there is no preamble T detected, which means the T-SPDIF transmitter 100 is not operating in the Type-2 T-SPDIF mode, the T-SPDIF receiver 200 may further detect whether the T-SPDIF transmitter 100 is operating in the normal mode or the Type-1 T-SPDIF mode as mentioned. According to a variation of this embodiment, the Type-1 T-SPDIF mode is not involved, and therefore, if there is no preamble T detected, the T-SPDIF receiver 200 determines that the T-SPDIF transmitter 100 is operating in the normal mode, and determines the number of audio sources whose audio data are transmitted through the single SPDIF link 105 to the T-SPDIF receiver 200 is equal to one.

In the Type-2 T-SPDIF mode mentioned above, the preamble appending operations performed by the T-SPDIF transmitter 100 are described in detail as follows. Except the first sub-frame of the frame corresponding to the beginning of the block, the specific preamble T is appended to the first sub-frame of each of the frames carrying the audio data of the specific audio source, which is the audio source corresponding to digital audio channel pairs (A, B) in this embodiment. In addition, preambles Z, X, and Y are further appended to the other sub-frames according to the AES3/SPDIF stream format.

According to this embodiment, preamble Z is appended to the first sub-frame of the frame corresponding to the beginning of the block. In addition, except the first sub-frame of the frame corresponding to the beginning of the block, preamble X is appended to the first sub-frame of each of the frames carrying the audio data of the other audio sources which are the audio sources respectively corresponding to the digital audio channel pairs (C, D), (E, F), and (G, H) in this embodiment. Additionally, preamble Y is appended to the second sub-frame of each frame.

Figure 8:
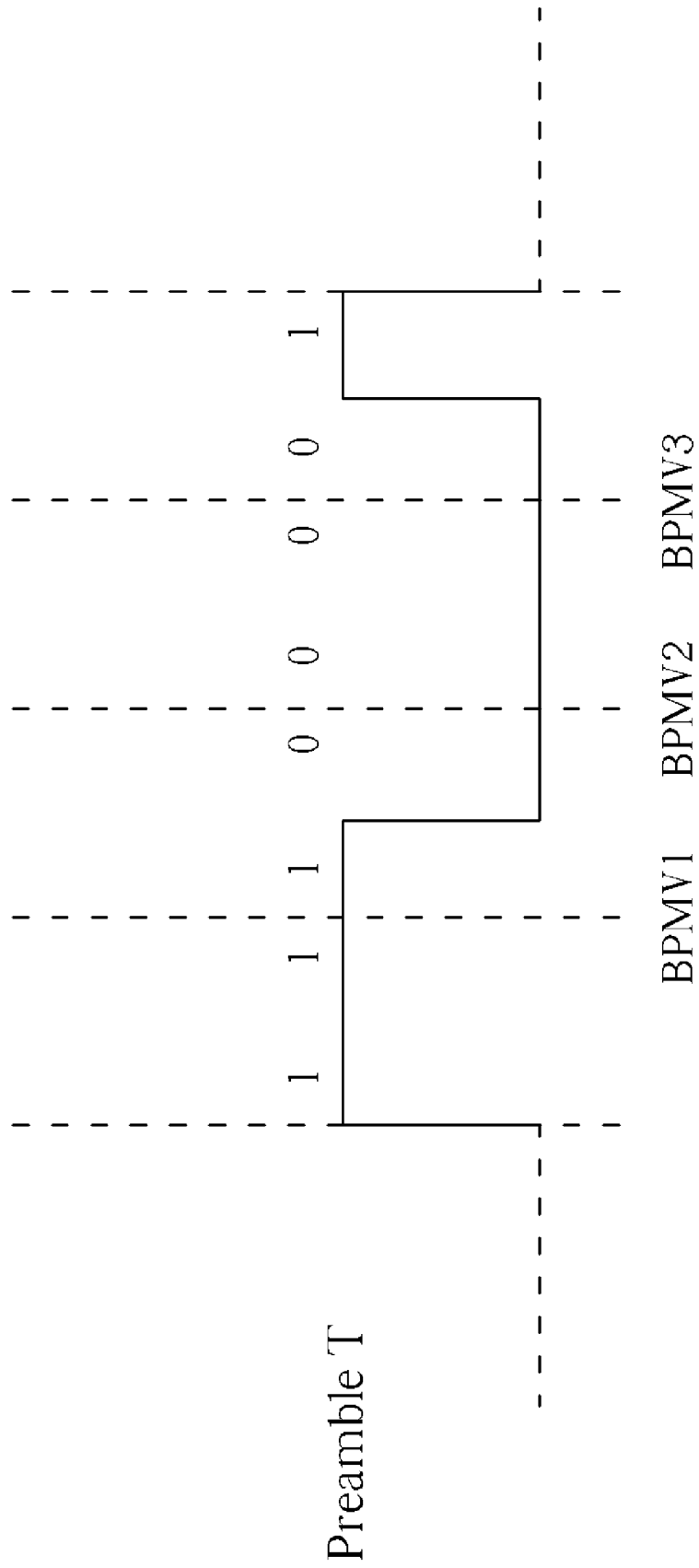
FIG. 8 illustrates a waveform of a specific preamble utilized in the embodiment shown in FIG. 7.

FIG. 8 illustrates a first waveform of the specific preamble T utilized in the embodiment shown in FIG. 7, where the specific preamble T includes three bi-phase mark violations BPMV1, BPMV2, and BPMV3 at three time points that are typically for state transition while performing bi-phase mark encoding on the audio data packed in the frames. It is noted that the first waveform shown in FIG. 8 corresponds to a logical sequence $\{1, 1, 1, 0, 0, 0, 0, 1\}$. During bi-phase mark encoding, the specific preamble T may have a second waveform, which is the inverted waveform of the first waveform shown in FIG. 8, where the second waveform corresponds to another logical sequence $\{0, 0, 0, 1, 1, 1, 1, 0\}$, which is an inverted version of the logical sequence $\{1, 1, 1, 0, 0, 0, 0, 1\}$.

According to a variation of the embodiment shown in FIG. 7, other waveforms can be applied to the specific preamble T, where the number of bi-phase mark violations of the waveforms applied to the specific preamble T in this variation can be equal to or greater than one.

Figure 9:
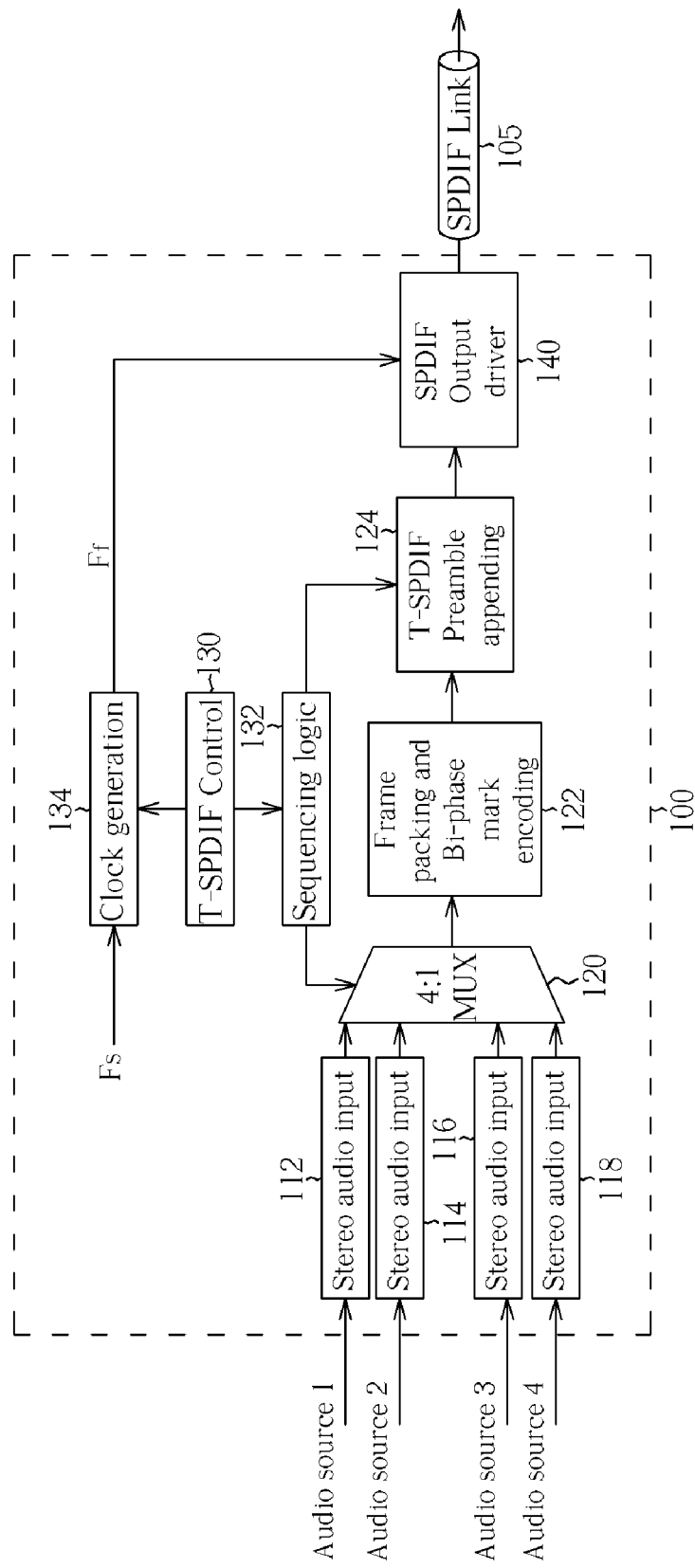
FIG. 9 is a diagram of the T-SPDIF transmitter shown in FIG. 3 according to one embodiment of the present invention.

FIG. 9 is a diagram of the T-SPDIF transmitter 100 shown in FIG. 3 according to one embodiment of the present invention, where the T-SPDIF transmitter 100 shown in FIG. 9 can be applied to the embodiment shown in FIG. 3. The T-SPDIF transmitter 100 comprises four stereo audio input unit 112, 114, 116, and 118 and a multiplexer 120, where the notation "4:1" of the multiplexer 120 represents that there are four input terminals and one output terminal for the audio data. In this embodiment, The T-SPDIF transmitter 100 further comprises a frame packing unit and a bi-phase mark encoder integrated into a frame packing and bi-phase mark encoding module 122 as shown in FIG. 9. The T-SPDIF transmitter 100 further comprises a T-SPDIF preamble appending unit 124, a T-SPDIF control unit 130, a sequencing logic 132, a clock generation unit 134, and an SPDIF output driver 140. According to the present invention, at least a portion of the T-SPDIF transmitter 100 can be integrated into one module such as the frame packing and bi-phase mark encoding module 122 shown in FIG. 9.

According to this embodiment, the stereo audio input unit 112, 114, 116, and 118 are utilized for respectively coupling the plurality of audio sources mentioned above. The multiplexer 120 sequences and multiplexes the audio data of the plurality of audio sources according to the control of the sequencing logic 132, which is controlled by the T-SPDIF control unit 130. The frame packing unit in the frame packing and bi-phase mark encoding module 122 packs the audio data of the plurality of audio sources into a plurality of frames such as the frames in the frame structure shown in FIG. 4. The bi-phase mark encoder in the frame packing and bi-phase mark encoding module 122 performs bi-phase mark encoding on the audio data in the frames. Under the control of the sequencing logic 132, the T-SPDIF preamble appending unit 124 appends preambles Z, X, and Y of the AES3/SPDIF stream format to the frames according to the number of audio sources in the Type-1 T-SPDIF mode mentioned above, or appends preambles Z, X, and Y of the AES3/SPDIF stream format and the specific preamble T differing from preambles Z, X, and Y to the frames according to the number of audio sources in the Type-2 T-SPDIF mode mentioned above.

In this embodiment, the audio sources have the same audio sampling frequency $F_S$, which can be 48 KHz as shown in FIG. 6. In addition, the T-SPDIF control unit 130 determines the frame rate $F_f$ for outputting the frames carrying the audio data into the single SPDIF link 105 according to the number of the audio sources, where the frame rate $F_f$ can be one of the IEC-60958 frame rate show in FIG. 6. More particularly, if the audio data of all the four audio sources are determined to be transmitted through the single SPDIF link 105, the frame rate $F_f$ can be 192 KHz. As a result, the clock generation unit 134 generates a clock corresponding to the frame rate $F_f$ and outputs the clock into the SPDIF output driver 140, so the SPDIF output driver 140 outputs the frames carrying the audio data into the single SPDIF link 105 with the frame rate $F_f$ according to the clock.

Figure 10:
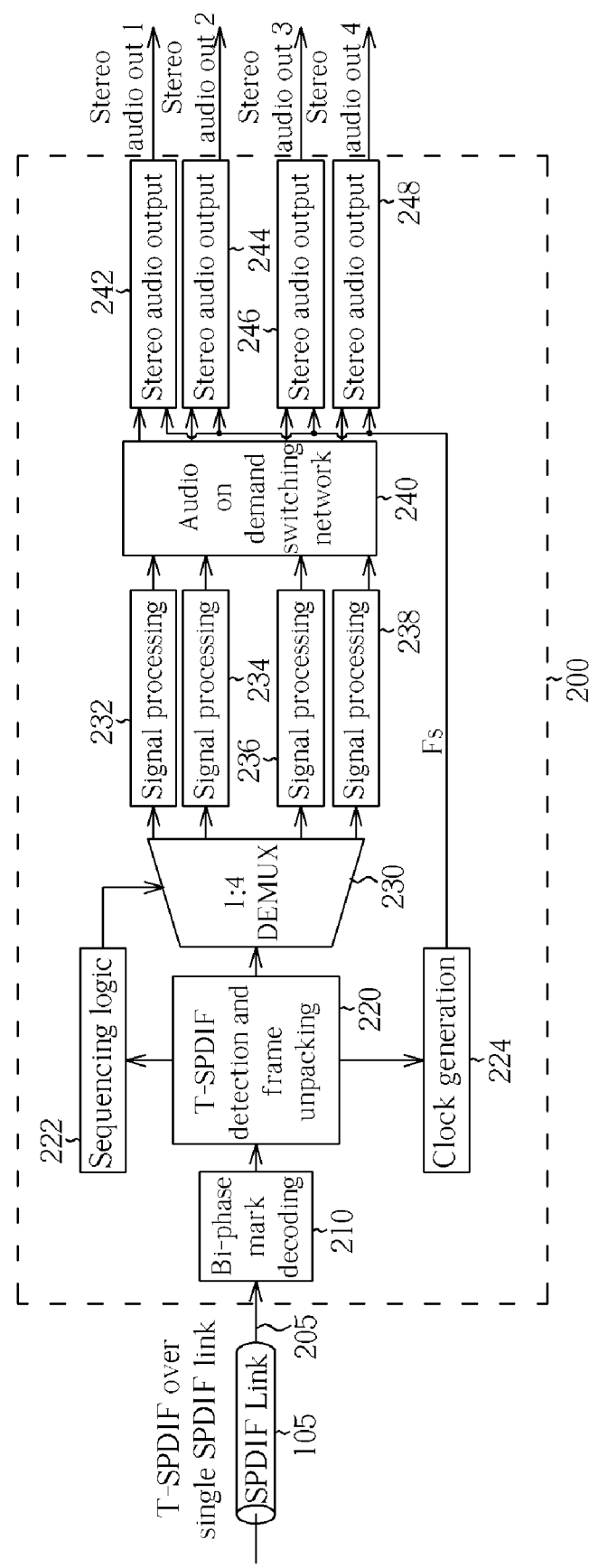
FIG. 10 is a diagram of the T-SPDIF receiver shown in FIG. 3 according to one embodiment of the present invention.

FIG. 10 is a diagram of the T-SPDIF receiver 200 shown in FIG. 3 according to one embodiment of the present invention, where the T-SPDIF receiver 200 shown in FIG. 10 can be applied to the embodiment shown in FIG. 3. The T-SPDIF receiver 200 comprises an input terminal 205, where the input terminal 205 is coupled to the single SPDIF link 105 as shown in FIG. 10. According to this embodiment, the T-SPDIF receiver 200 further comprises a bi-phase mark decoder such as the bi-phase mark decoding unit 210 shown in FIG. 10. In addition, the T-SPDIF receiver 200 further comprises a T-SPDIF detection unit and a frame unpacking unit integrated into a T-SPDIF detection and frame unpacking module 220 as shown in FIG. 10. Additionally, the T-SPDIF receiver 200 further comprises sequencing logic 222, a clock generation unit 224, a demultiplexer 230, and an output stage, where the output stage of this embodiment comprises four signal processing units 232, 234, 236, and 238, an audio on demand switching network 240, and four stereo audio output units 242, 244, 246, and 248. Similarly, the notation "1:4" of the demultiplexer 230 represents that there are one input terminal and four output terminals for the audio data. According to the present invention, at least a portion of the T-SPDIF receiver 200 can be integrated into one module.

In this embodiment, the input terminal 205 is utilized for receiving the frames mentioned in the embodiment show in FIG. 3, and more particularly, the frames mentioned in the embodiment show in FIG. 9, from the single SPDIF link 105. In addition, the bi-phase mark decoding unit 210 performs bi-phase mark decoding on the audio data in the frames. The T-SPDIF detection unit in the T-SPDIF detection and frame unpacking module 220 detects the preambles appended to the frames, and the frame unpacking unit in the T-SPDIF detection and frame unpacking module 220 unpacks the audio data from frames, where the T-SPDIF detection unit is capable of performing the preamble detection mentioned in the embodiment shown in FIG. 5 and the preamble detection mentioned in the embodiment shown in FIG. 7. As a result, the sequencing logic 222 may control the demultiplexer 230 according to the preamble detection performed by the T-SPDIF detection unit, and the clock generation unit 224 may control the output stage according to the preamble detection performed by the T-SPDIF detection unit.

Accordingly, the demultiplexer 230 demultiplexes the audio data of the plurality of audio sources according the control of the sequencing logic 222, and the output stage outputs the audio data of at least one audio source of the plurality of audio sources with the audio sampling frequency $F_S$ of the at least one audio source. In the output stage of this embodiment, the signal processing units 232, 234, 236, and 238 perform signal processing on the audio data from the demultiplexer 230, where each signal processing unit is capable of buffering the audio data from the demultiplexer 230 and outputting the audio data to the audio on demand switching network 240. Within processing results from the signal processing units 232, 234, 236, and 238, the audio on demand switching network 240 selects the processing result corresponding to the at least one audio source to output the audio data of the at least one audio source mentioned above.

According to this embodiment, the T-SPDIF detection unit mentioned above detects the preambles appended to the frames to determine the audio sampling frequency $F_S$ of the at least one audio source. In addition, the clock generation unit 224 generates a clock corresponding to the audio sampling frequency $F_S$ of the at least one audio source, and the output stage outputs the audio data of at least one audio source according to the clock. As the audio sources in this embodiment have the same audio sampling frequency $F_S$, the clock generation unit 224 generates the clock for use by all the four stereo audio output units 242, 244, 246, and 248. According to a variation of this embodiment, the audio sources may have different audio sampling frequencies, and the clock generation unit in this variation generates a plurality of clocks for use of the stereo audio output units, respectively.

Figure 11:
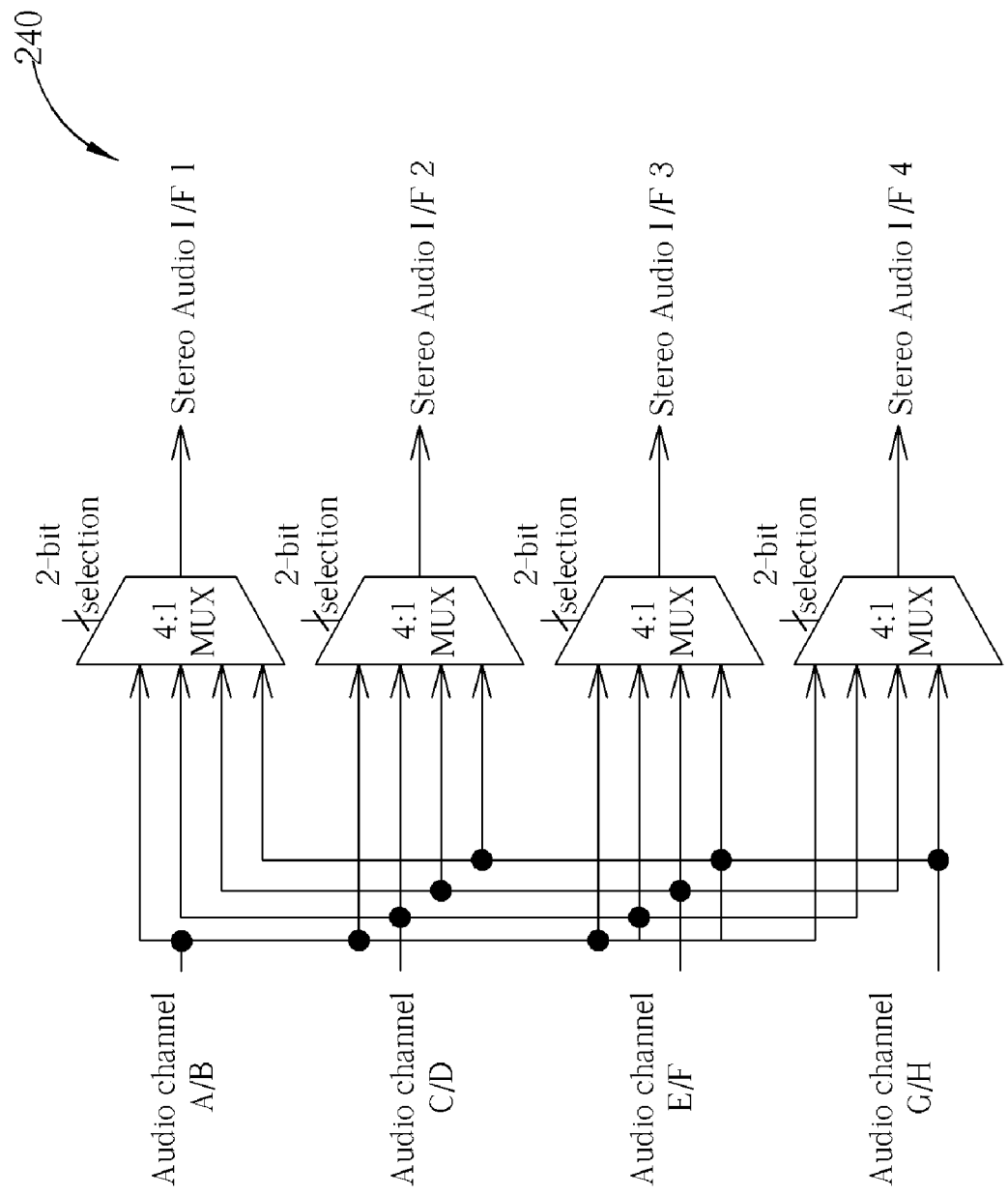
FIG. 11 is a diagram of the audio on demand switching network shown in FIG. 10.

It is noted that the audio on demand switching network 240 in the output stage of the embodiment shown in FIG. 10 is illustrated as shown in FIG. 11, where each multiplexer in the audio on demand switching network 240 shown in FIG. 11 may multiplex the audio data of the audio source corresponding to the 2-bit selection thereof, which represents the corresponding user's demand in this embodiment.

According to variations of the embodiments mentioned above, if preambles Z, X, and Y of the AES3/SPDIF stream format are appended to the frames in the Type-1 T-SPDIF mode, the T-SPDIF preamble appending unit 124 is capable of appending preamble Y to the first sub-frame of at least one frame of the frames according to the number of audio sources or appending preamble X to the second sub-frame of at least one frame of the frames according to the number of audio sources. Additionally, the T-SPDIF preamble appending unit 124 further appends one of preambles Z, X, and Y to one of the other sub-frames according to the AES3/SPDIF stream format. For example, the preamble sequences {X (or Z), Y, Y, Y}, {X (or Z), Y, Y, Y, Y, Y}, and {X (or Z), Y, Y, Y, Y, Y, Y, Y} as shown in FIG. 5 can be respectively replaced with preamble sequences {X (or Z), X, X, Y}, {X (or Z), X, X, X, X, Y}, and {X (or Z), X, X, X, X, X, X, Y} according to some of these variations.

According to variations of the embodiments mentioned above, if preambles Z, X, and Y of the AES3/SPDIF stream format and the specific preamble T differing from preambles Z, X, and Y are appended to the frames in the Type-2 T-SPDIF mode, the T-SPDIF preamble appending unit 124 is capable of appending the specific preamble to at least one sub-frame of at least one frame of the frames according to the number of audio sources. Additionally, the T-SPDIF preamble appending unit 124 further appends one of preambles Z, X, and Y to one of the other sub-frames according to the AES3/SPDIF stream format. For example, the preamble sequences {T (or Z), Y, X, Y}, {T (or Z), Y, X, Y, X, Y}, and {T (or Z), Y, X, Y, X, Y, X, Y} as shown in FIG. 7 can be respectively replaced with preamble sequences {X (or Z), Y, X, T}, {X (or Z), Y, X, Y, X, T}, and {X (or Z), Y, X, Y, X, Y, X, T} according to some of these variations.

In contrast to the prior art, the present invention methods and apparatuses can be implemented with a single SPDIF link, rather than a plurality of SPDIF links. In addition, according to the present invention, it is unnecessary to utilize multiple transmitters and receivers such as those shown in FIG. 2. As a result, related costs can be saved, and the complexity for implementing an SPDIF-like transmission system such as an audio on demand system is greatly reduced.

It is another advantage of the present invention that the present invention methods and apparatuses can be implemented with an SPDIF-like transmission system that is backward compatible to the SPDIF-related resources.

It is another advantage of the present invention that it does not take the researchers and developers in the art a lot of efforts to implement the newly disclosed functions of the present invention while the researchers and developers in the art retain the teaching disclosed in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for transmitting audio data of a plurality of audio sources through a single Sony/Philips Digital Interface (SPDIF) link, comprising:
   sequencing and multiplexing the audio data of the plurality of audio sources to pack the audio data of the plurality of audio sources into a plurality of frames of a block, wherein each frame comprises two sub-frames;
   performing bi-phase mark encoding on the audio data in the frames;
   appending preambles Z, X, and Y of the Audio Engineering Society-3 (AES3)/SPDIF stream format to the frames according to the number of audio sources in a first mode, or appending preambles Z, X, and Y of the AES3/SPDIF stream format and a specific preamble differing from preambles Z, X, and Y to the frames according to the number of audio sources in a second mode; and
   outputting the frames carrying the audio data into the single SPDIF link with a frame rate greater than an audio sampling frequency of one of the audio sources;
   wherein in a situation where the step of appending preambles Z, X, and Y of the AES3/SPDIF stream format to the frames is executed, the step of appending preambles Z, X, and Y of the AES3/SPDIF stream format to the frames further comprises:
   appending preamble Y to the first sub-frame of at least one frame of the frames according to the number of audio sources or appending preamble X to the second sub-frame of at least one frame of the frames according to the number of audio sources; and
   appending one of preambles Z, X, and Y to one of the other sub-frames according to the AES3/SPDIF stream format; or
   wherein in a situation where the step of appending preambles Z, X, and Y of the AES3/SPDIF stream format and the specific preamble differing from preambles Z, X, and Y to the frames is executed, the step of appending preambles Z, X, and Y of the AES3/SPDIF stream format and the specific preamble differing from preambles Z, X, and Y to the frames further comprises:
   appending the specific preamble to at least one sub-frame of at least one frame of the frames according to the number of audio sources; and
   appending one of preambles Z, X, and Y to one of the other sub-frames according to the AES3/SPDIF stream format.

2. The method of claim 1, wherein preamble Y is appended to the first sub-frame of the at least one frame of the frames, and the step of appending preamble Y to the first sub-frame of the at least one frame of the frames according to the number of audio sources further comprises:
   except the first sub-frame of the frame corresponding to the beginning of the block, appending preamble Y to the first sub-frame of each of the frames carrying the audio data of the audio sources except a specific audio source.

3. The method of claim 2, wherein the step of appending preambles Z, X, and Y of the AES3/SPDIF stream format to the frames further comprises:
   appending preamble Z to the first sub-frame of the frame corresponding to the beginning of the block;
   except the first sub-frame of the frame corresponding to the beginning of the block, appending preamble X to the first sub-frame of each of the frames carrying the audio data of the specific audio source; and
   appending preamble Y to the second sub-frame of each frame.

4. The method of claim 1, wherein preamble X is appended to the second sub-frame of the at least one frame of the frames, and the step of appending preamble X to the second sub-frame of the at least one frame of the frames according to the number of audio sources further comprises:
   appending preamble X to the second sub-frame of each of the frames carrying the audio data of the audio sources except a specific audio source.

5. The method of claim 4, wherein the step of appending preambles Z, X, and Y of the AES3/SPDIF stream format to the frames further comprises:
   appending preamble Z to the first sub-frame of the frame corresponding to the beginning of the block;
   except the first sub-frame of the frame corresponding to the beginning of the block, appending preamble X to the first sub-frame of each frame; and
   appending preamble Y to the second sub-frame of each of the frames carrying the audio data of the specific audio source.

6. The method of claim 1, wherein the step of appending the specific preamble to the at least one sub-frame of the at least one frame of the frames according to the number of audio sources further comprises:
   except the first sub-frame of the frame corresponding to the beginning of the block, appending the specific preamble to the first sub-frame of each of the frames carrying the audio data of the specific audio source.

7. The method of claim 6, wherein the step of appending preambles Z, X, and Y of the AES3/SPDIF stream format and the specific preamble differing from preambles Z, X, and Y to the frames further comprises:

appending preamble Z to the first sub-frame of the frame corresponding to the beginning of the block;

except the first sub-frame of the frame corresponding to the beginning of the block, appending preamble X to the first sub-frame of each of the frames carrying the audio data of the other audio sources; and appending preamble Y to the second sub-frame of each frame.

8. The method of claim 1, wherein the audio sources are serial digital audio sources.

9. The method of claim 1, wherein in the step of appending preambles Z, X, and Y of the AES3/SPDIF stream format and the specific preamble differing from preambles Z, X, and Y to the frames, the specific preamble includes three bi-phase mark violations.

10. The method of claim 1, wherein the audio sources have the same audio sampling frequency, and the method further comprises:

determining the frame rate for outputting the frames carrying the audio data into the single SPDIF link according to the number of the audio sources.

11. The method of claim 1, further comprising:

receiving the frames carrying the audio data from the single SPDIF link;

performing bi-phase mark decoding on the audio data in the frames; and detecting the preambles appended to the frames to unpack the audio data from frames, demultiplex the audio data of the plurality of audio sources, and output the audio data of at least one audio source of the plurality of audio sources with the audio sampling frequency of the at least one audio source.

12. A method for receiving audio data of a plurality of audio sources through a single Sony/Philips Digital Interface (SPDIF) link, comprising:

receiving a plurality of frames of a block from the single SPDIF link, wherein each frame comprises two sub-frames, the frames carry the audio data that are bi-phase mark encoded, and before the frames are transmitted through the single SPDIF link with a frame rate greater than an audio sampling frequency of one of the audio sources, preambles Z, X, and Y of the Audio Engineering Society-3 (AES3)/SPDIF stream format are appended to the frames according to the number of audio sources in a first mode, or preambles Z, X, and Y of the AES3/SPDIF stream format and a specific preamble differing from preambles Z, X, and Y are appended to the frames according to the number of audio sources in a second mode;

performing bi-phase mark decoding on the audio data in the frames; and detecting the preambles appended to the frames to unpack the audio data from frames, demultiplex the audio data of the plurality of audio sources, and output the audio data of at least one audio source of the plurality of audio sources with the audio sampling frequency of the at least one audio source;

wherein in a situation where preambles Z, X, and Y of the AES3/SPDIF stream format are appended to the frames in the first mode, preamble Y is appended to the first sub-frame of at least one frame of the frames according to the number of audio sources or preamble X is appended to the second sub-frame of at least one frame of the frames according to the number of audio sources, and preambles Z, X, and Y are further appended to the other sub-frames according to the AES3/SPDIF stream format; or wherein in a situation where preambles Z, X, and Y of the AES3/SPDIF stream format and the specific preamble differing from preambles Z, X, and Y are appended to the frames in the second mode, the specific preamble is appended to at least one sub-frame of at least one frame of the frames according to the number of audio sources, and preambles Z, X, and Y are further appended to the other sub-frames according to the AES3/SPDIF stream format.

13. The method of claim 12, wherein if preambles Z, X, and Y of the AES3/SPDIF stream format are appended to the frames in the first mode, except the first sub-frame of the frame corresponding to the beginning of the block, preamble Y is appended to the first sub-frame of each of the frames carrying the audio data of the audio sources except a specific audio source.

14. The method of claim 13, wherein if preambles Z, X, and Y of the AES3/SPDIF stream format are appended to the frames in the first mode, preamble Z is appended to the first sub-frame of the frame corresponding to the beginning of the block, except the first sub-frame of the frame corresponding to the beginning of the block, preamble X is appended to the first sub-frame of each of the frames carrying the audio data of the specific audio source, and preamble Y is appended to the second sub-frame of each frame.

15. The method of claim 12, wherein if preambles Z, X, and Y of the AES3/SPDIF stream format are appended to the frames in the first mode, preamble X is appended to the second sub-frame of each of the frames carrying the audio data of the audio sources except a specific audio source.

16. The method of claim 15, wherein if preambles Z, X, and Y of the AES3/SPDIF stream format are appended to the frames in the first mode, preamble Z is appended to the first sub-frame of the frame corresponding to the beginning of the block, except the first sub-frame of the frame corresponding to the beginning of the block, preamble X is appended to the first sub-frame of each frame, and Y is appended to the second sub-frame of each of the frames carrying the audio data of the specific audio source.

17. The method of claim 12, wherein if preambles Z, X, and Y of the AES3/SPDIF stream format and the specific preamble differing from preambles Z, X, and Y are appended to the frames in the second mode, except the first sub-frame of the frame corresponding to the beginning of the block, the specific preamble is appended to the first sub-frame of each of the frames carrying the audio data of the specific audio source.

18. The method of claim 17, wherein if preambles Z, X, and Y of the AES3/SPDIF stream format and the specific preamble differing from preambles Z, X, and Y are appended to the frames in the second mode, preamble Z is appended to the first sub-frame of the frame corresponding to the beginning of the block, except the first sub-frame of the frame corresponding to the beginning of the block, preamble X is appended to the first sub-frame of each of the frames carrying the audio data of the other audio sources, and preamble Y is appended to the second sub-frame of each frame.

19. The method of claim 12, wherein the audio sources are serial digital audio sources.

20. The method of claim 12, further comprising:

performing signal processing on the audio data demultiplexed in the demultiplexing step to output the audio data of the at least one audio source of the plurality of audio sources; and within processing results from the signal processing, selecting the processing result corresponding to the at least one audio source to output the audio data of the at least one audio source.

21. The method of claim 12, wherein the step of detecting the preambles appended to the frames further comprises:

detecting the preambles appended to the frames to determine the audio sampling frequency of the at least one audio source.

22. An apparatus for transmitting audio data of a plurality of audio sources through a single Sony/Philips Digital Interface (SPDIF) link, comprising:

a multiplexer for sequencing and multiplexing the audio data of the plurality of audio sources;

a frame packing unit, coupled to the multiplexer, for packing the audio data of the plurality of audio sources into a plurality of frames of a block, wherein each frame comprises two sub-frames;

a bi-phase mark encoder, coupled to the frame packing unit, for performing bi-phase mark encoding on the audio data in the frames;

a preamble appending unit, coupled to the bi-phase mark encoder, for appending preambles Z, X, and Y of the Audio Engineering Society-3 (AES3)/SPDIF stream format to the frames according to the number of audio sources in a first mode, or appending preambles Z, X, and Y of the AES3/SPDIF stream format and a specific preamble differing from preambles Z, X, and Y to the frames according to the number of audio sources in a second mode; and an output driver, coupled to the preamble appending unit, for outputting the frames carrying the audio data into the single SPDIF link with a frame rate greater than the audio sampling frequency of one of the audio sources;

wherein in a situation where preambles Z, X, and Y of the AES3/SPDIF stream format are appended to the frames in the first mode, the preamble appending unit appends preamble Y to the first sub-frame of at least one frame of the frames according to the number of audio sources or the preamble appending unit appends preamble X to the second sub-frame of at least one frame of the frames according to the number of audio sources, and the preamble appending unit further appends one of preambles Z, X, and Y to one of the other sub-frames according to the AES3/SPDIF stream format; or wherein in a situation where preambles Z, X, and Y of the AES3/SPDIF stream format and the specific preamble differing from preambles Z, X, and Y are appended to the frames in the second mode, the preamble appending unit appends the specific preamble to at least one sub-frame of at least one frame of the frames according to the number of audio sources, and the preamble appending unit further appends one of preambles Z, X, and Y to one of the other sub-frames according to the AES3/SPDIF stream format.

23. The apparatus of claim 22, wherein at least a portion of the apparatus is integrated into one module.

24. The apparatus of claim 22, wherein the audio sources have the same audio sampling frequency, and the apparatus further comprises:

a control unit for determining the frame rate for outputting the frames carrying the audio data into the single SPDIF link according to the number of the audio sources; and a clock generation unit, coupled to the control unit and the output driver, for generating a clock corresponding to the frame rate for outputting the frames carrying the audio data into the single SPDIF link;

wherein the output driver outputs the frames according to the clock.

25. An apparatus for receiving audio data of a plurality of audio sources through a single Sony/Philips Digital Interface (SPDIF) link, comprising:

an input terminal, coupled to the single SPDIF link, for receiving a plurality of frames of a block from the single SPDIF link, wherein each frame comprises two sub-frames, the frames carry the audio data that are bi-phase mark encoded, and before the frames are transmitted through the single SPDIF link with a frame rate greater than the audio sampling frequency of one of the audio sources, preambles Z, X, and Y of the Audio Engineering Society-3 (AES3)/SPDIF stream format are appended to the frames according to the number of audio sources in a first mode, or preambles Z, X, and Y of the AES3/SPDIF stream format and a specific preamble differing from preambles Z, X, and Y are appended to the frames according to the number of audio sources in a second mode;

a bi-phase mark decoder, coupled to the input terminal, for performing bi-phase mark decoding on the audio data in the frames;

a detection unit, coupled to the bi-phase mark decoder, for detecting the preambles appended to the frames;

a frame unpacking unit, coupled to the detection unit, for unpacking the audio data from frames;

a demultiplexer, coupled to the frame unpacking unit, for demultiplexing the audio data of the plurality of audio sources; and an output stage, coupled to the demultiplexer, for outputting the audio data of at least one audio source of the plurality of audio sources with the audio sampling frequency of the at least one audio source;

wherein in a situation where preambles Z, X, and Y of the AES3/SPDIF stream format are appended to the frames in the first mode, preamble Y is appended to the first sub-frame of at least one frame of the frames according to the number of audio sources or preamble X is appended to the second sub-frame of at least one frame of the frames according to the number of audio sources, and preambles Z, X, and Y are farther appended to the other sub-frames according to the AES3/SPDIF stream format; or wherein in a situation where preambles Z, X, and Y of the AES3/SPDIF stream format and the specific preamble differing from preambles Z, X, and Y are appended to the frames in the second mode, the specific preamble is appended to at least one sub-frame of at least one frame of the frames according to the number of audio sources, and preambles Z, X, and Y are further appended to the other sub-frames according to the AES3/SPDIF stream format.

26. The apparatus of claim 25, wherein at least a portion of the apparatus is integrated into one module.

27. The apparatus of claim 25, wherein the detection unit detects the preambles appended to the frames to determine the audio sampling frequency of the at least one audio source, and the apparatus further comprises:

a clock generation unit for generating a clock corresponding to the audio sampling frequency of the at least one audio source;

wherein the output stage outputs the audio data of at least one audio source according to the clock.

28. The apparatus of claim 25, wherein the output stage comprises:

a plurality of signal processing units, coupled to the demultiplexer, for performing signal processing on the audio data from the demultiplexer; and a switching network, coupled to the plurality of signal processing units, within processing results from the signal processing units, the switching network selecting the processing result corresponding to the at least one audio source to output the audio data of the at least one audio source.

\* \* \* \* \*